US006623841B1

(12) United States Patent
Venkatasanthanam et al.

(10) Patent No.: US 6,623,841 B1
(45) Date of Patent: Sep. 23, 2003

(54) INHERENTLY INK-RECEPTIVE FILM SUBSTRATES

(75) Inventors: Sriram Venkatasanthanam, Pasadena, CA (US); Ramin Heydarpour, Beverly Hills, CA (US); Frank Y. Shih, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/547,942

(22) Filed: Apr. 11, 2000

(51) Int. Cl.[7] ............................ B32B 27/14; B32B 3/00

(52) U.S. Cl. ....................... 428/195; 428/323; 428/343; 428/480; 428/500

(58) Field of Search ................................ 428/195, 323, 428/343, 480, 500

(56) References Cited

U.S. PATENT DOCUMENTS

| | | | | |
|---|---|---|---|---|
| 4,438,175 A | | 3/1984 | Ashcraft et al. | 428/315.5 |
| 4,861,644 A | | 8/1989 | Young et al. | 428/195 |
| 5,658,977 A | | 8/1997 | Yang et al. | 524/503 |
| 6,153,288 A | * | 11/2000 | Shih et al. | 428/195 |
| 6,252,027 B1 | * | 6/2001 | Mihara et al. | 527/311 |

FOREIGN PATENT DOCUMENTS

| | | |
|---|---|---|
| EP | 818 321 | 1/1998 |
| EP | 934 833 | 8/1999 |
| EP | 962 330 | 12/1999 |
| JP | 10119426 | 5/1998 |
| JP | 10272832 | 10/1998 |
| JP | 2000318298 | 11/2000 |
| WO | WO 92/00188 | 1/1992 |
| WO | WO 97/20697 | 6/1997 |

* cited by examiner

*Primary Examiner*—Bruce H. Hess
*Assistant Examiner*—B. Shewareged
(74) *Attorney, Agent, or Firm*—Christie, Parker & Hale, LLP

(57) ABSTRACT

Ink receptive substrates comprise a base layer formed from a water-insoluble thermoplastic polymer, and an ink receptive layer disposed over the base layer. The ink receptive layer is formed from a melt processable blend of a water-soluble polymer and a substantially water-insoluble polymer, and provides an inherently ink receptive surface without further surface treatment. The ink receptive blend comprises in the range of from 20 to 80 percent by weight water-soluble polymer, and in the range of from 20 to 80 percent by weight substantially water-insoluble polymer based on the total weight of the blend. The blend has a melting temperature in the range of from about 100 to 600° F. Preferred water-soluble polymers include polyvinyl alcohols and polyalkyl oxazolines. Preferred ink receptive substrates of this invention comprise a base layer and ink receptive layer that are formed simultaneously by coextrusion process. Ink receptive substrates of this invention can include the ink receptive layer on one or both surfaces of the base layer, and/or can be constructed in the form of a pressure-sensitive adhesive label, i.e., with a pressure-sensitive adhesive material disposed on a surface of the base layer opposite the ink receptive layer.

65 Claims, 4 Drawing Sheets

INHERENTLY INK-RECEPTIVE FILM SUBSTRATES

FIELD OF THE INVENTION

This invention relates to film substrates that are used as an ink receptive print media and, more particularly to non-topcoated film substrates having at least one ink receptive surface, constructions such as labels and labelstocks incorporating such film substrates, and methods for preparing the same.

BACKGROUND OF THE INVENTION

Ink jet printing is a well-known and commonly used means of providing an image onto a substrate. Ink jet printers typically use one of two different types of ink; dye-based inks and pigment-based inks. With dye-based ink, the color of the ink is imparted by a dye that is soluble in a fluid carrier. A common type of fluid carrier is one comprising a blend of water and glycol. Such dye-based inks are relatively inexpensive, easy to process, and are suitable for use in low cost applications where long term durability is not a concern. For pigment-based inks, the color is imparted by particles which are dispersed, rather than dissolved, in a fluid carrier. Most of the common pigments used are insoluble in organic solvents and water can be chosen for lightfastness.

A feature common to both types of inks is that the fluid carrier used with each is generally water soluble. Thus, substrates useful for performing as an inkjet receiving media preferably comprise a surface having ink receptive properties to allow quick drying of ink droplets generated by an inkjet print head. Substrates known in the art useful as an inkjet receiving media include those having a two-layer construction comprising a base layer and a topcoat layer. In such known substrate embodiments, the base layer is formed from a polymeric film such as polypropylene, polyester, or polyvinyl chloride. The topcoat layer is applied to a surface of the base layer, using a solvent that is subsequently removed by drying, and is specially formulated to provide ink receptive properties.

However, the use of a topcoat to provide ink receptive properties to a substrate is known to introduce certain manufacturing limitations, and adversely affect other substrate properties that can ultimately limit ink printed substrate use. For example, topcoated inkjet substrates are known to lack durability and, because most topcoat formulations contain water-soluble components, they are also sensitive to moisture, thereby necessitating the use of a protective overlaminate layer or film after printing. Additionally, the level of active components in the topcoat formulation is limited by the viscosity of the topcoat formulation that can be handled in the coater. As a result, the efficiency of the topcoat is commonly increased by increasing the layer thickness, which is known to introduce increased costs and coat weight inconsistencies, which inconsistencies are undesirable because they can adversely affect the performance of the final product, i.e., the ink jet printed substrate.

In an effort to avoid the above-mentioned adverse consequences of topcoated substrates, non-topcoated substrates having varying degrees of ink receptive properties have been developed. For example, U.S. Pat. No. 4,438,175 discloses a film structure comprising a biaxially-oriented polymeric film having an ink receptive surface that is formed by delaminating the biaxially-oriented polymeric film into two separate layers, each of which being attached to a skin layer. The resulting polymeric film structure comprises a first layer of a thermoplastic polymer matrix material comprising a strata of voids. Void-initiating solid particles are positioned within a substantial number of the voids and are phase distinct and incompatible with the matrix material. The first layer has a surface that, due to the presence and distribution of voids, is a non-even, microcrater, lamellae-like, random texturized, ink receptive configuration. The resulting polymeric film includes a second layer, formed by the placement of the skin layer onto the matrix, having a void-free surface.

While this patent discloses a substrate having an ink receptive surface that is formed without topcoating, the so formed substrate requires a two-step manufacturing process of first forming the combined polymeric film and skin layer construction, and then delaminating the combined film and skin layer construction into two resulting ink receptive film structures. Thus, while the substrate described in this patent avoids having to use a topcoating method, it does not avoid the inefficiencies and costs associated with having to use multiple preparation steps.

U.S. Pat. No. 4,861,644 describes a substrate having an ink receptive surface comprising a matrix of ultrahigh molecular weight polyolefin, a large proportion of finely-divided water-insoluble siliceous filler, and interconnecting pores. The substrate is produced by first forming an extruded sheet from a mixture of the polyolefin the siliceous filler and other processing aids, calendaring the extruded sheet, drying the calendared sheet, and stretching the dried sheet to provide a desired biaxially stretched orientation. While the so formed substrate also avoids the need for topcoating to obtain ink receptive properties, the substrate is nevertheless formed using the multi-step process of extruding, calendaring, drying and stretching.

International Publication No. WO 92/00188 discloses a writeable and printable, unstretched synthetic paper that is formed by extruding a film with a continuous olefin resin matrix that contains an effective amount of particulate filler having inherent microvoids. The microvoid-containing particulate filler is dispersed uniformly and randomly throughout the continuous olefin resin matrix to provide non-mechanically produced microvoids in communication with the surface pores to provide ink receptivity thereto. The synthetic paper of this patent is formed by extruding a mixture of the olefin resin matrix and particulate filler into a desired sheet thickness. While the so-formed substrate avoids the step of topcoating to achieve an ink receptive surface structure, it relies on the formation of a porous or voided surface structure that can be the source of performance limitations.

International Publication No. WO 92/00188 discloses an inkjet printable microporous ethylene-vinyl alcohol copolymer film that is formed by melt blending a mixture of ethylene-vinyl alcohol copolymer and a compatible polymer or compound in which the copolymer will dissolve to form a solution at its melting temperature. The solution is formed into a film, which is cooled. During the cooling step, a phase separation occurs between the compatible copolymer or compound and the ethylene-vinyl alcohol polymer, providing a film comprising an aggregate of a first phase particles of ethylene-vinyl alcohol copolymer in a second phase of the compatible polymer or compound. The cooled film is collected, the compatible polymer or compound is extracted, and the resulting film is stretched. Micropores are formed in the film structure by extracting the compatible polymer or compound therefrom. While the substrate formed according to this publication avoids the step of topcoating to achieve an ink receptive surface structure, like the other above-described non-topcoating methods, it also relies on the formation of a porous or voided surface structure that can be the source of performance limitations.

The common theme of the above described non-topcoated ink receptive substrates is that they each depend on use of a voided or porous substrate surface to provide a surface structure that is receptive to ink deposited thereon. The use of a substrate surface having such a voided or porous structure, however, is not without its limitations. For example, it is known that such substrates can suffer from poor image quality. Substrates having such surface structures tend to act like a sponge, absorbing ink deep into the substrate body, often resulting in poor color densities and resolutions. These substrates are also prone to provide poor optical qualities as the surface voids oftentimes provides a surface that is mostly opaque or translucent, thereby limiting potential substrate applications. Additionally, substrates having such voided surface structures oftentimes require a complex manufacturing process. For example, it is not unusual for such substrates to have a complex material formulation and/or multiple process steps, which can add both to the expense and time associated with making the substrate.

For these reasons, it is desired that an ink receptive substrate be constructed that both avoids the need for topcoating, and that avoids reliance on a voided microstructure, i.e., that is "inherently" ink receptive. It is desired that such inherently ink receptive substrates provide properties of image quality and optics that are superior to those provided by substrates having voided microstructures. It is desired that such inherently ink receptive substrates be fabricated in a manner that avoids the need for multiple time consuming and costly process steps. It is further desired that inherently ink receptive substrate constructions of this invention be capable of receiving ink as deposited by inkjet technique, as well as by other methods of ink transfer.

SUMMARY OF THE INVENTION

Ink receptive substrates of this invention comprise a base layer formed from a water-insoluble thermoplastic polymer, and an ink receptive layer disposed over the base layer. The ink receptive layer is formed from a melt processable blend of a water-soluble polymer and a substantially water-insoluble polymer, and provides an inherently ink receptive surface without further surface treatment. A tie layer can optionally be interposed between base and ink receptive layer.

The base layer is selected from the group of thermoplastic material consisting of polyolefins, polyesters, polyurethanes, polyvinyl chlorides, polyamides, polystyrene, ethylene vinyl alcohol, and mixtures thereof. The ink receptive blend comprises in the range of from 20 to 80 percent by weight water-soluble polymer, and in the range of from 20 to 80 percent by weight substantially water-insoluble polymer based on the total weight of the blend. The blend may include an optional compatibilizing agent that is chemically compatible with both the water-soluble polymer and the substantially water-insoluble polymer.

The blend has a melting temperature in the range of from about 100 to 600° F. The water-soluble polymer component of the blend is selected from the group of compounds consisting of polyvinyl alcohols, polyalkyl oxazolines, polyphenyl oxazolines, polyvinyl pyrrolidones, polyacrylic-acids, polymethyl methacrylates, polymethacrylic acids, styrene maleic anhydrides, alkyl celluloses, carboxyalkyl celluloses, hydroxyalkyl celluloses, polyethylene oxides, polyethylene-imines, and mixtures thereof.

Preferred water-soluble polymers include polyalkyl oxazoline and polyvinyl alcohol. The substantially water-insoluble polymer component of the blend is selected from the group of polyolefins consisting of modified and unmodified polyesters, polypropylenes, polyethylenes, polystyrenes, polybutylenes, and copolymers and mixtures thereof.

In a preferred embodiment, the base layer and ink receptive layer of ink receptive substrates of this invention are formed simultaneously by coextrusion process. Ink receptive substrates of this invention can include the ink receptive layer on one or both surfaces of the base layer, and/or can be constructed in the form of a pressure-sensitive adhesive label, i.e., with a pressure-sensitive adhesive material disposed on a surface of the base layer opposite the ink receptive layer.

Ink receptive substrates of this invention are inherently ink receptive in that they avoid that need for topcoating or reliance on a voided microstructure to gain ink receptivity. Ink receptive substrates of this invention provide properties of image quality and optics that are superior to those provided by substrates having voided microstructures. Ink receptive substrates of this invention are fabricated in a manner that avoids the need for multiple time consuming and costly process steps.

DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

Ink printable substrates of this invention are referred as being “inherently” ink receptive, or inkjet printable, because the substrate surface structure is engineered to be receptive to an ink medium without subsequent topcoating, treating (e.g., corona treating or the like), and without depending on a voided or porous microstructure. Rather, substrates produced according to principles of this invention have a surface formed from a specially designed blend of a water-soluble polymer and a substantially water-insoluble polymer, which blend provides superior ink receptive properties when compared to conventional substrates having topcoated or voided surfaces.

Figure 1:
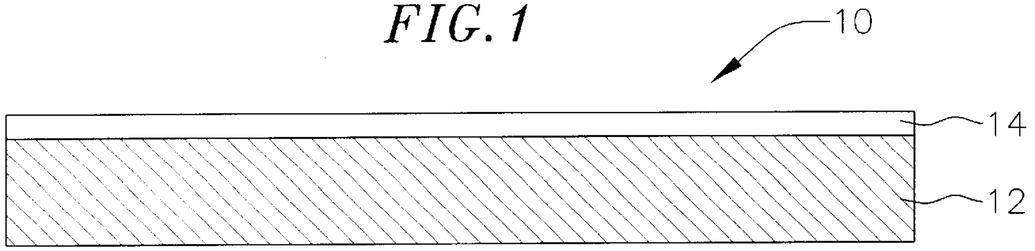
FIG. 1 is a schematic cross-sectional side view of an embodiment of an ink receptive substrate of this invention comprising a single ink receptive surface.

FIG. 1 illustrates an embodiment of an ink receptive substrate 10 of this invention comprising a base layer 12 having oppositely oriented surfaces, and an ink receptive layer 14 disposed on one of the base layer surfaces. The base layer 12 can be formed from a variety of different thermoplastic polymers depending on the substrate end use application. Suitable base layer materials for forming substrates of this invention include meltable, film-forming substances selected from the group of materials including polyolefins such as polyethylenes, polypropylenes and polybutylenes, polyvinyl chlorides, polyamides, polyesters, polystyrenes, polyurethanes, polyacrylates, polyvinyl acetate, polysulfone, polyvinylidene chloride, polyethylene methyl acrylates (EMA), polyethylene methacrylic acids (EMAA), polyethylene ethyl acrylate, nylons, polyvinyl pyrillidone, polyether esters, polyether amides, polycarbonates, styrene acry-lonitrile polymer, ionomers based on sodium or zinc salts of ethylene/methacrylic acid, polymethyl methacrylates, cellulosics, fluoroplastics, acry-lonitrile butadiene styrene polymer, polyethylenevinyl alcohol, and copolymers and mixtures thereof. The selected base layer material can also include fillers, pigments, processing, and/or performance aids conventionally used in the art.

Preferred thermoplastic polymers useful for forming the base layer have a processing temperature within the range of from about 150 to 600° F., with those having a processing temperature of 250 to 550° F. being particularly preferred. Example preferred materials for the base layer include a polypropylene homopolymers and copolymers available, for example, from Union Carbide Corporation, under the product name UCC Polypropylene; polyesters available, for example from Eastman Chemical Company, under the product name Eastar®; and polyethylenes available, for example from Dow Chemical Company, under the product name Dowlex®. These example materials are preferred because of their relatively low cost, their extrudable film-forming ability, and their ability to provide a degree of stiffness and strength suitable for most uses.

The ink receptive layer comprises of a blend of a water-soluble polymer and a substantially water-insoluble polymer. Suitable water-soluble polymers useful for forming the ink receptive layer include, polyvinyl alcohol, polyalkyl oxazoline, polyphenyl oxazoline, polyvinyl pyrrolidone, polyacrylic-acid, polymethyl methacrylate, polymethacrylic acid, styrene maleic anhydride, methyl cellulose, ethyl cellulose, carboxymethyl cellulose, hydroxyethyl cellulose, polyethylene oxide, polyethylene-imine, and mixtures thereof. The water-insoluble polymer component of the blend is either chemically compatible with the water-soluble polymer, or is able to be compatible with the water-soluble component by the use of suitable compatibilizing agents.

Forming the ink receptive surface from a blend of these two polymers is desired because the combination of a water-soluble polymer and a substantially water-insoluble polymer provides a desired degree of hydrophillicity that creates an ink receptive surface. Materials useful for forming the ink receptive layer can further comprise cationic modifiers, wetting agents, colloidal silica, inherently dissipative polymer, water proofing agents and anti-static agents.

A first preferred ink receptive layer comprises of a blend of a polyalkyl oxazoline and a polyolefin. A preferred blend comprises a resin blend of polyethyl oxazoline and polyolefin with a compatibilizing agent. A blend of water-soluble polyethyl oxazoline and polyolefin is desired because the substantially hydrophobic polyolefin is useful for providing a desired degree of hydrophillicity to create an ink receptive surface that is substantially water insoluble. Further, the compatibilizing agent is used in the blend to provide a miscible polymeric resin blend of polyethyl oxazoline and polyolefin. Consequently, the compatibilizing agent enables processing of the present blend into films without defects that may arise due to the incompatibility between polyethyl oxazoline and polyolefin.

A desired polyethyl oxazoline for producing this blend has a molecular weight in the range from about 50,000 to about 1,000,000, more preferably from about 200,000 to about 500,000, and kinematic viscosity in the range from about 18 to about 90 centi-stokes. Polyethyl oxazolines having a molecular weight outside of this range are not easily processable using common thermoplastic processing techniques. Example preferred polyethyl oxazolines are discussed in greater detail below in Examples 1 and 2.

Polyolefins useful for combining with the polyethyl oxazoline to form the ink receptive layer blend can be selected from the group including modified and unmodified polypropylenes, polyethylenes, polystyrenes, polybutylenes and copolymers and mixtures thereof. These types of polyolefins are preferred because they are capable of forming a miscible blend with the polyalkyl oxazoline in the presence of suitable compatibilizing agents, and at reasonable concentrations become the continuous phase. Being the continuous phase, the substantially hydrophobic polyolefin provides the ability to control the degree of hydrophillicity of the surface by altering the polyolefin concentration in the blend.

Compatibilizing agents useful for forming the ink receptive layer can be selected from the group including anhydride modified polyolefins such as anhydride modified polypropylene, anhydride modified polyethylene, anhydride-modified ethylene vinyl acetate, anhydride modified ethyl methyl acrylate, anhydride modified ethylene ethyl acrylate, anhydride modified ethyl acrylic acid, anhydride modified ethyl glycidyl methacrylate, anhydride modified ethyl n butyl acrylate and copolymers, terpolymers and mixtures thereof. These types of anhydride modified polyolefins are preferred because they posses a polyolefin backbone selected to make them miscible in the polyolefin blend component, and the anhydride groups are capable of reacting with the oxazoline groups of the polyalkyl oxazoline blend component.

A particularly preferred polyalkyl oxazoline, polyolefin, and optional compatiblizer blend is one that comprises in the range of from about 20 to 80 percent by weight of polyalkyl oxazoline, in the range of from about 10 to 80 percent by weight of polyolefin and, up to about 40 percent by weight compatiblizer. Using an amount of the polyalkyl oxazoline, polyolefin, and compatiblizer outside of this range is not desirable because the optimal degree of hydrophilicity for functioning as an ink receptive layer may not be achieved outside these ranges.

Preferred polyalkyl oxazolines for forming the blend include those available from, for example, Polymer Chemistry Innovations of Tucson, Ariz., under product name Aquazol®; Preferred polyolefins for forming the blend include polypropylene available from Union Carbide Corporation under the product name UCC Polypropylene. Preferred anhydride modified polyolefins for forming the blend include anhydride modified ethylene vinyl acetate available from E.I. du Pont under the product name Bynel®.

A second preferred ink receptive layer comprises of a blend of polyvinyl alcohol and an aliphatic polyester. An example alcohol/polyester blend is one disclosed in U.S. Pat. No. 5,658,977, which is incorporated herein by reference, comprising a miscible polymeric resin blend of polyvinyl alcohol and aliphatic polyester with minor proportions of diluents, processing and performance aids. A blend of polyvinyl alcohol and aliphatic polyester is desired, as opposed to a blend of polyvinyl alcohol with another water-soluble polymer, or as opposed to using polyvinyl alcohol alone, because the aliphatic polyester serves to provide a desired degree of hydrophillicity to create an ink receptive surface that is substantially water insoluble. Further, the liquid ester diluent disclosed in U.S. Pat. No. 5,658,977 is useful for reducing or depressing the melting point of the polyvinyl alcohol to aid in film processing.

As discussed in more detail below, the liquid aliphatic ester ingredient serves to reduce the melting range of the mixture to 280 to 360° F. Consequently, the liquid aliphatic ester enables processing of the present blend into films at temperatures below which the polyvinyl alcohol would otherwise suffer thermal degradation. Additionally, this melting range is desired for forming the ink receptive substrate of this invention by multi-layer co-extrusion process because it provides a wider processing window than that of polyvinyl alcohol alone, and complements the melt temperature range of the base layer material.

A desired polyvinyl alcohol for producing this blend has a degree of hydrolysis in the range of from about 80 to 98 percent, and a degree of polymerization in the range of from about 150 to 650. A polyvinyl alcohol ingredient having a degree of hydrolysis outside of this stated range is not desired because it may result in poor printing performance, poor drying and coloring properties that could cause print image feathering and bleeding. A polyvinyl alcohol ingredient having a degree of polymerization outside of this stated range is not desired as polyvinyl alcohols having a degree of polymerization of less than about 150 are known to be highly water sensitive, making them extremely difficult or impossible to co-extrude. Polyvinyl alcohols having a degree of polymerization greater than about 650 have a relatively high viscosity that may create difficulties in forming a continuous thin film.

The polyvinyl alcohol ingredient can comprise a single-type of polyvinyl alcohol having the above-desired properties, or can comprise a mixture of two or more polyvinyl alcohols, wherein the resulting mixture displays the above-desired properties.

Aliphatic polyesters useful for forming the ink receptive layer blend can be selected from the group including polycaprolactone, polyethylene-adipate, unsaturated polyesters, cyclo-polyesters, substituted aliphatic polyesters, and combinations thereof. These types of aliphatic polyesters are preferred because they are miscible with the polyvinyl alcohol and, at a reasonable concentration, become a continuous phase of the blend. As the continuous phase, the substantially hydrophobic aliphatic polyester provides the ability to control the degree of hydrophillicity of the surface by altering the aliphatic polyester concentration in the blend.

A particularly preferred polyvinyl alcohol/aliphatic polyester blend is one that comprises in the range of from about 20 to 80 percent by weight polyvinyl alcohol, and in the range of from about 20 to 80 percent by weight aliphatic polyester. A blend formed by using less than about 20 percent by weight of the polyvinyl alcohol may not create a level of hydrophillicity that can provide a drying time that is meaningful for the application. A blend formed by using greater than about 80 percent by weight of the polyvinyl alcohol may create a surface that is highly hydrophilic, thereby picking up moisture from air and destroying the surface integrity. A particularly preferred alcohol/polyester blend comprises approximately 40 percent by weight of the polyvinyl alcohol.

A blend formed by using less than about 20 percent by weight of the aliphatic polyester ingredient may not form the continuous phase of the blend, hence may not function to control the surface hydrophillicity. A blend formed by using greater than about 80 percent by weight of the aliphatic polyester ingredient may render the surface completely hydrophobic, and thereby cause poor ink reception. A particularly preferred alcohol/polyester blend comprises approximately 60 percent by weight of the aliphatic polyester.

Preferred polyvinyl alcohols for forming the blend include those available from, for example, E.I. du Pont under the product name Elvanol®, and from Air Products and Chemicals of Allentown, Pa., under the product name Airvol®. Preferred aliphatic polyesters for forming the blend include those available from, for example, Union Carbide under the product name Tone®.

Figure 2:
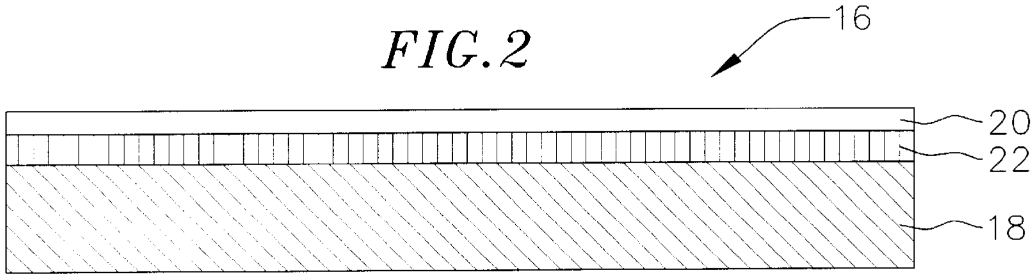
FIG. 2 is a schematic cross-sectional side view of another embodiment of an ink receptive substrate of this invention comprising a tie layer.

FIG. 2 illustrates another embodiment of an ink receptive substrate 16 of this invention comprising a base layer 18 having oppositely oriented surfaces, and an ink receptive layer 20 forming one exposed surface of the base layer. Unlike the embodiment illustrated in FIG. 1, this embodiment further comprises a compatiblizing tie layer 22 that is interposed between the base layer 18 and ink receptive layer 20 surfaces. The base layer 18 and ink receptive layer 20 are each formed from the same types of materials discussed above. The tie layer 22 is formed from materials that demonstrate compatibility with the materials selected for forming the base and ink receptive layers to bond the base and ink receptive layers together, thereby facilitating formation of substrate of this invention via multi-layer co-extrusion process, as will be described in greater detail below.

It is to be understood that use of the tie layer is optional between the ink receptive layer and base layer, and may be necessary depending on the relative degree of compatibility between the materials selected for use as the ink receptive and tie layers. Suitable materials useful for forming the tie layer include those set forth above as being useful for forming the base layer, that have been modified to display a degree of compatibility with the blend of water-soluble polymer and substantially water-insoluble polymer used to form the ink receptive layer. Therefore, it is to be understood that the tie layer material can be different for each different base and ink receptive material that is selected.

Example preferred tie layer materials include anhydride modified polyolefins such as anhydride modified polypropylene, anhydride modified polyethylene, anhydride modified ethylene vinyl acetate, anhydride modified ethyl methyl acrylate, anhydride modified ethyl acrylic acid, and copolymers and mixtures thereof. A particularly preferred material for forming the tie layer is an anhydride modified ethylene vinyl acetate that is available, for example, from E.I. du Pont under the product name Bynel®. This particular type of anhydride modified polyolefin is preferred because they are functionalized with reactive monomers that can covalently or ionically bond to various substrates such as ethylene- and propylene- based polyolefins, ionomers, polyamides, polyvinyl alcohols, polyethyl oxazolines, polyesters, polycarbonates, and styrenics.

Figure 3:
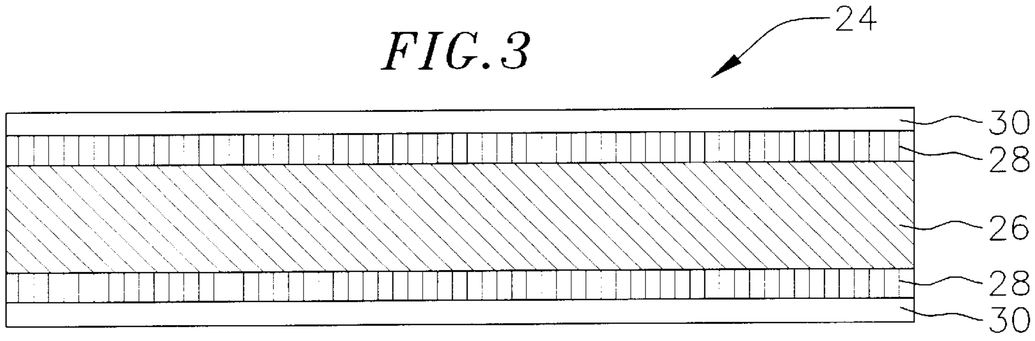
FIG. 3 is a schematic cross-sectional side view of still another embodiment of an ink receptive substrate of this invention comprising two ink receptive surfaces.

FIG. 3 illustrates still another embodiment of an ink receptive substrate 24 of this invention comprising two opposed ink receptive surfaces. Specifically, this ink receptive substrate embodiment comprises a base layer 26 having tie layers 28 disposed onto each exposed base layer surface, and having an ink receptive layer 30 disposed onto each exposed tie layer surface. The materials selected for forming the base layer, tie layers and ink receptive layers are the same as those discussed above. This embodiment is useful for applications, e.g., inkjet printable application, where a dual-sided printed object is desired, and is preferably formed by multi-layer co-extrusion process as described below.

Figure 4:
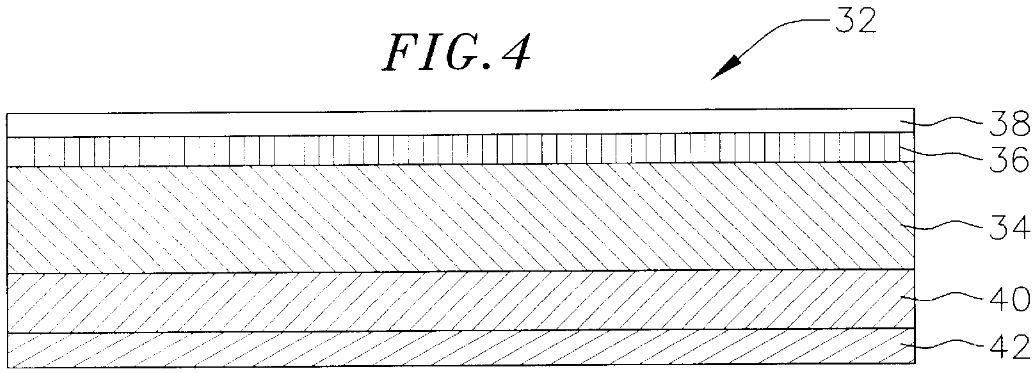
FIG. 4 is a schematic cross-sectional side view of still another embodiment of an ink receptive substrate of this invention in the form of a labelstock construction.

FIG. 4 illustrates a still other embodiment of an ink receptive substrate 32 of this invention in the form of a labelstock. Specifically, the ink receptive substrate 32 comprises a base layer 34 having opposed first and second surfaces. A tie layer 36 is optionally disposed onto the base layer first surface, and an ink receptive layer 38 is disposed onto a surface of the tie layer, much like the embodiment described above and illustrated in FIG. 2. However, unlike the embodiment of FIG. 2, this ink receptive substrate embodiment is in the form of a labelstock and further comprises an adhesive layer 40 disposed onto the base layer second surface.

In the event that the adhesive layer 40 is formed from a solvent-activated adhesive, the substrate 32 need not include a further layer to protect the substrate from unintended adhesion with contiguous surfaces. In the event that the adhesive layer 40 is formed from a pressure-sensitive adhesive, the substrate 32 comprises a release liner 42 disposed onto the surface of the adhesive layer to protect the substrate against unintended adhesion with contiguous surfaces. Constructed in this manner, the ink receptive substrate 32 can function in the form of a label for application onto the surface of a particular substrate after it is printed upon by placing the exposed surface of the adhesive layer 40 into contact with the particular substrate surface.

The base layer, 34, tie layer 36, and ink receptive layer 38 are each formed from the same types of materials discussed above for the same respective layers. The adhesive layer 40 can be formed from solvent activated adhesives or from pressure-sensitive adhesives well known in the art. Suitable pressure-sensitive adhesives (PSAs) include conventional silicone-based PSAs, rubber-based PSAs, and acrylic-based PSAs, which can be in the form of a hot melt, an emulsion or aqueous dispersion, as a solvent solution, or as a film membrane. Commonly available rubber-based PSAs that are well suited for hot melt application include those disclosed in U.S. Pat. No. 3,239,478, that is incorporated herein by reference. A commercial example of such hot melt adhesives is H2187-01 hot melt PSA sold by Ato Findley, Inc., of Wauwatosa, Wis. Suitable emulsion and solvent acrylic-based PSAs include those disclosed in U.S. Pat. Nos. 5,639,811 and 5,164,444, respectively, that are incorporated herein by reference.

The adhesive material forming the adhesive layer can be applied to the base layer surface either by process of multi-layer coextrusion with the base layer, ink receptive layer, and tie layer (if needed) in the form of a hot melt, by extrusion coating onto the preformed base layer in the form of a hot melt, or by coating onto the preformed base layer on the form of an emulsion or aqueous dispersion, as a solvent solution, or as a film membrane.

The ink receptive layer used to form each of the above-described ink receptive substrates is either formed simultaneously with the underlying base layer, and any optional interposed tie layer, by multi-layer coextrusion process, or can be deposited by itself or with any optional tie layer by extrusion process onto a preformed base layer. The following examples are illustrative of ink receptive substrates of this invention:

EXAMPLE NO. 1

Figure 5:
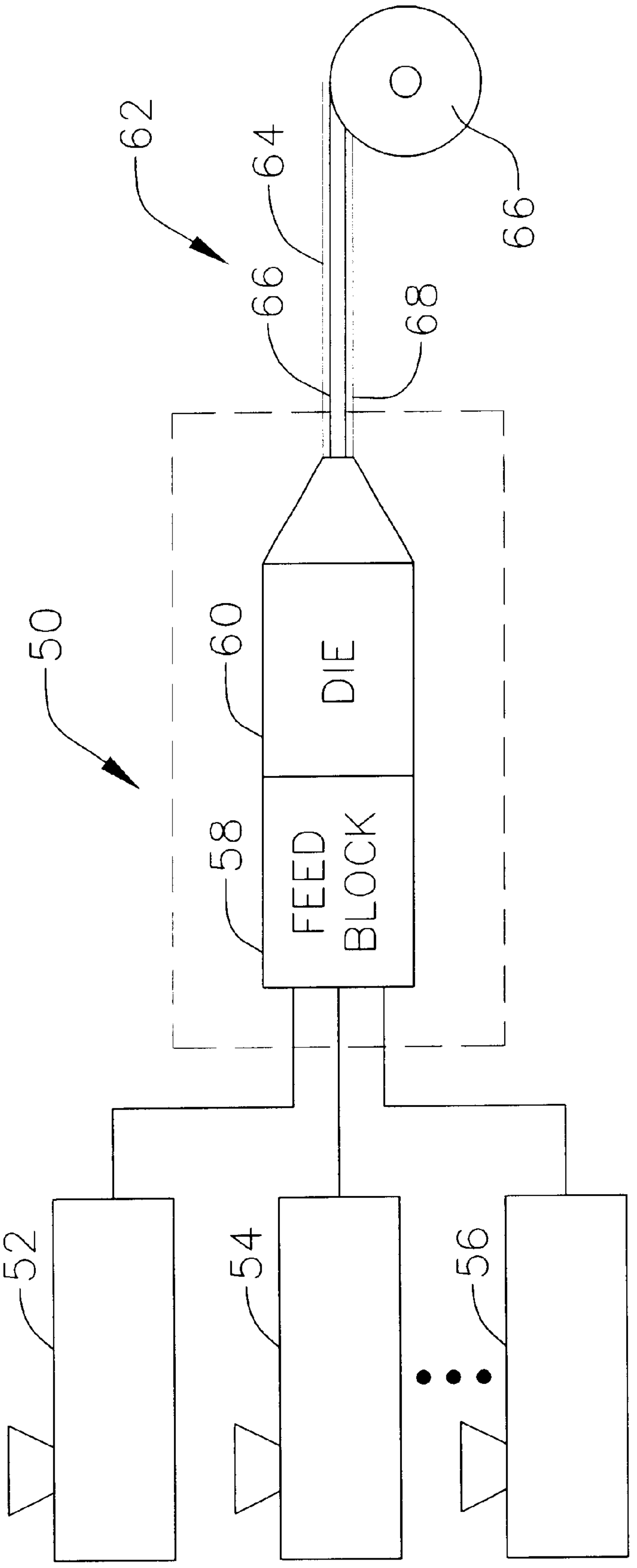
FIG. 5 is a schematic side view of a process used for forming ink receptive substrates of this invention.

Ink Receptive Substrate Comprising Polyoxazoline/Polyester Ink Receptive Surface An ink receptive substrate, as discussed above and illustrated in FIGS. 1 and 2, was prepared in the following manner using a multi-layer coextrusion process 50 as illustrated in FIG. 5. A first extruder 52, used for delivering an extrusion of ink receptive layer forming material, was loaded with a blend of Aquazol®, poly(2-ethyl-2-oxazoline), produced by Polymer Chemistry Innovations, Inc., Kodar®, poly(ethylene-terephthalate) copolyester designated as PETG, produced by Eastman Chemical Co., and Selar®, modified polyester copolymer, produced by du Pont. The blend in the first extruder had a melt processing range of from about 150 to 600° F., and the extruder was operated within a temperature range of from about 450 to 550° F.

A third extruder 56, used for delivering an extrusion of base layer forming material, was loaded with Kodar®, poly(ethylene-terephthalate) copolyester designated as PETG, produced by Eastman Chemical Co., and was operated within a temperature range of from about 450 to 550° F.

A second extruder 54, may be optionally used for delivering an extrusion of a tie layer of polymeric material adherent to the ink receptive layer and the base layer and juxtaposed between the two layers. The need for the adherent layer would depend on the level of layer adhesion, between the base layer and the ink receptive layer, that is desired in the final product. In this example, a tie layer formed from Selar® was loaded into the second extruder 54 and was operated within a temperature range of from about 450 to 550° F.

The extruders 52, 54, and 56 were each screw extruders that were operated at around 20 to 80 rpms, and within a pressure range of from about 750 to 4000 psi. The extrudate from each of the extruders 52, 54 and 56 were delivered to a distribution manifold 58 that was configured to combine the three extrusion feed streams and direct the combined streams into a die 60 that is configured and operated at a temperature within the range of from 450 to 550° F.

The die 60 is configured to provide a multi-layer output stream 62 comprising an ink receptive layer 64, a tie layer 66, and a base layer 68, that were each formed simultaneously with one another. The so-formed ink receptive substrate sheet was cooled by passing over a chilled roller (not shown), and was collected on a collection roll 66.

EXAMPLE NO. 2

Ink Receptive Substrate Comprising Polyoxazoline/Polyolefin Ink Receptive Surface The process described above for Example No. 1 and illustrated in FIG. 5 was repeated using the first extruder 52, for delivering an extrusion of ink receptive layer forming material, that was loaded with a blend of Aquazol®, poly (2-ethyl-2-oxazoline), DS6D81, UCC polypropylene, and Bynel®, anhydride modified ethylene vinyl acetate. The blend in the first extruder had a melt processing range of 250 to 500° F., and the extruder was operated within a temperature range of from about 350 to 450° F.

A third extruder 56, used for delivering an extrusion of base layer forming material, was loaded with DS6D81, UCC polypropylene, produced by Union Carbide Corp., and was operated within a temperature range of from about 350 to 450° F.

A second extruder 54, may be optionally used for delivering an extrusion of a tie layer of polymeric material adherent to the ink receptive layer and the base layer and juxtaposed between the two layers. A tie layer formed from an adherent polymeric material, Bynel®, was loaded into the second extruder 54 and was operated within a temperature range of from about 350 to 450° F. The extruders 52, 54, and 56 were each screw extruders that were operated at around 20 to 80 rpms, and within a pressure range of from about 750 to 4000 psi. The extrudate was then delivered to die 60, as described above in Example No. 1, that was configured and operated at a temperature within the range of from 350 to 45° F.

The die 60 provided a multi-layer output stream 62 comprising an ink receptive layer 64, a tie layer 66, and a base layer 68, that were each formed simultaneously with one another. The so-formed ink receptive substrate sheet was cooled by passing over a chilled roller (not shown), and was collected on a collection roll 66.

EXAMPLE NO. 3

Ink Receptive Substrate Comprising Polyvinyl Alcohol/ Polyester Ink Receptive Surface The process described above in Example Nos. 1 and 2, and illustrated in FIG. 5, was repeated using a first extruder 52 loaded with a blend of Airvol® polyvinyl alcohol, Tone® poly(caprolactone), and minor amounts of Triacetin and Glycerin for delivering an extrusion blend of ink receptive layer. The blend in the first extruder had a melt processing range of 250 to 450° F., and the extruder was operated within a temperature range of from about 250 to 350° F.

A third extruder 56, used for delivering an extrusion of base layer forming material, was loaded with DX5E66, polypropylene, and was operated within a temperature range of from about 350 to 450° F. A second extruder 54, may optionally be used for delivering an extrusion of a tie layer of polymeric material adherent to the ink receptive layer and the base layer and juxtaposed between the two layers. A tie layer formed from an adherent polymeric material, Bynel® anhydride modified ethylene vinyl acetate, was loaded into the second extruder 54 and was operated within a temperature range of from about 350 to 450° F. The extruders 52, 54, and 56 were each screw extruders that were operated at around 20 to 80 rpms, and within a pressure range of from about 750 to 4000 psi. The extrudate was then delivered to die 60, as described above in Example Nos. 1 and 2, that was configured and operated at a temperature within the range of from 350 to 450° F.

The die 60 provided a multi-layer output stream 62 comprising an ink receptive layer 64, a tie layer 66, and a base layer 68, that were each formed simultaneously with one another. The so-formed ink receptive substrate sheet was cooled by passing over a chilled roller (not shown), and was collected on a collection roll 66.

Figure 6:
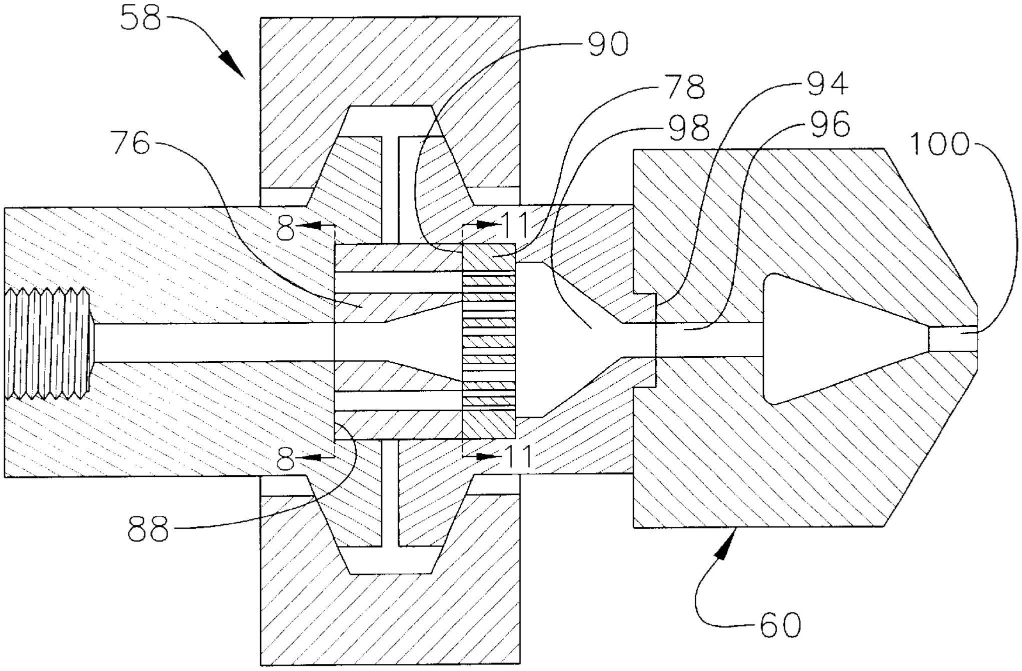
FIGS. 6 and 7 are schematic cross-sectional views of a distribution manifold and die as used in the process of FIG. 5, taken at 90 degrees to one another.
Figure 7:
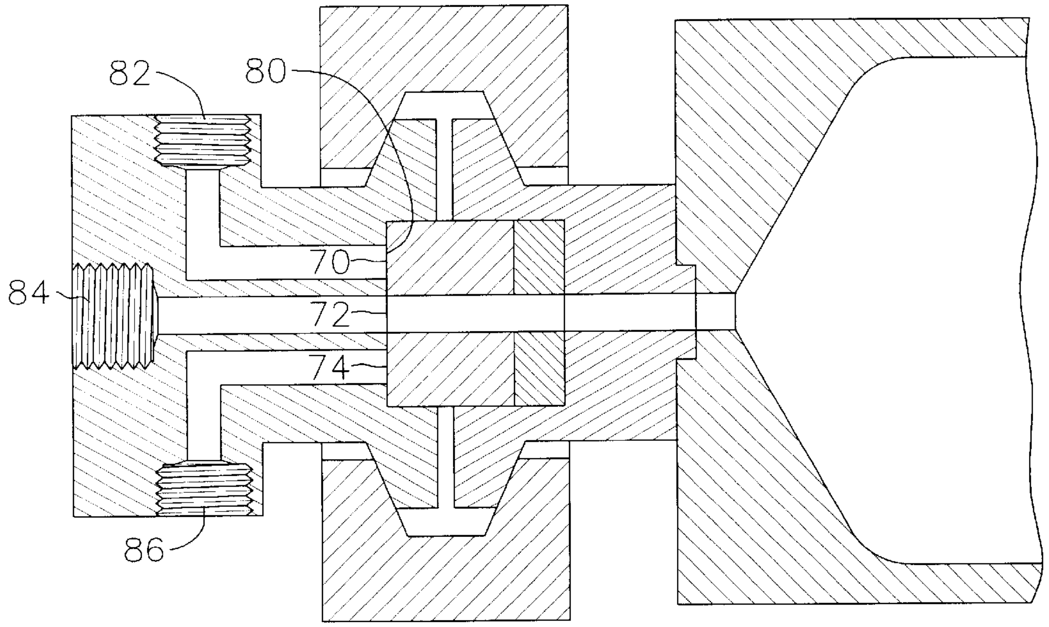

FIGS. 6 and 7 schematically depict the sectional views (at 90 degree angles to one another) the distribution manifold 58 and die 60 used in the multi-layer coextrusion process 50 of FIG. 5. The distribution manifold 58 includes a first extrusion input port 82 for receiving the ink receptive layer forming material provided by the first extruder 52, a second extrusion input port 84 for receiving the adherent layer forming material provided by the second extruder 54, and a third extrusion input port 86 for receiving the base layer forming material provided by the third extruder 56.

Figure 8:
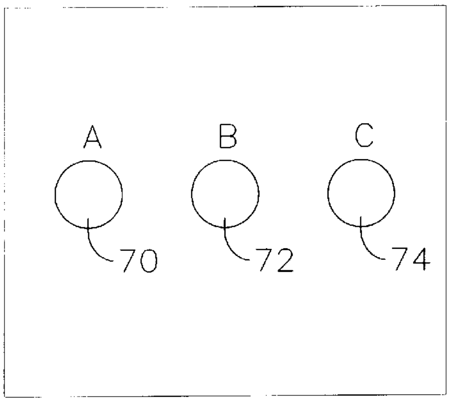
FIG. 8 is a schematic front view of a distribution block face taken along section 8—8 of the distribution manifold of FIG. 6.

The first, second, and third extrusion input ports 82, 84 and 86 are configured so that the discharge ends of the three feed streams 70, 72 and 74 terminate on a face 80 (see FIG. 6) of a distribution block 76 (see FIG. 6). FIG. 8 shows a view of the face 80 taken along the section 8—8 of FIG. 6, illustrating three discharge ends 70, 72 and 74. Referring to FIG. 6, the distribution block 76 comprises a first or feed face 88 at one end, and a second or discharge face 90 at an opposite end. The design and use of such distribution block has been the subject of several patents, for example U.S. Pat. No. 3,924,990, which is incorporated herein by reference, describes a coextrusion apparatus for providing a variety of products by using different distribution block designs.

Figure 9:
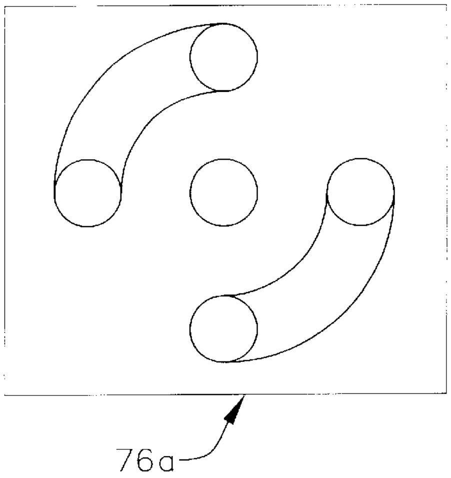
FIG. 9 is a schematic front view of a distribution block face used to form the ink receptive substrates of FIGS. 1 and 2.
Figure 11:
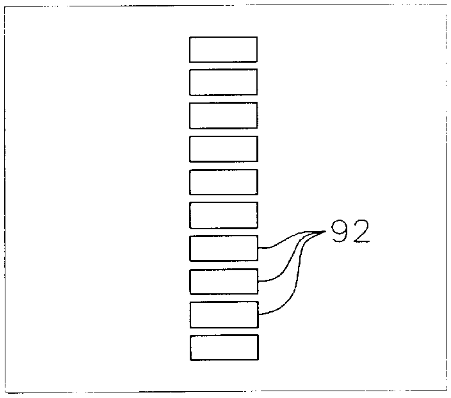
FIG. 11 is a schematic front view of a combining block taken along section 11—11 of the distribution manifold of FIG. 6.

The main purpose of the distribution block is to alter the flow path of the feed streams within the distribution manifold as desired. FIG. 9 shows a distribution block 76a that was used to provide the ink receptive substrate constructions illustrated in FIGS. 1 and 2. In this case, the feed streams are rotated by 90 degrees going from face 88 to face 90. FIG. 11 illustrates a view of along section 11—11 of an inlet portion of a combining block 78, having parallel adjacent slots 92, of FIG. 6. The combining block is disposed within the distribution manifold adjacent the distribution block to bring together the layers of material passing through the distribution block, and to ensure a uniform volumetric flow to the die. The distribution manifold and respective extruded material input ports, are operated within the temperature ranges noted above for the respective extruders.

Referring back to FIGS. 5 and 6, the die 60 is attached to a dispensing end 94 of the distribution manifold 58, and comprises a receiving port 96 that is in fluid communication with a feed block output port 98. The die includes a final delivery port 100 downstream of and in fluid flow communication with the receiving port 96 that is sized and shaped to provide the desired multi-layer ink receptive substrate. The extruders, feed block, and die are each operated to provide an ink receptive substrate having both a desired overall sheet thickness, and a desired discrete ink receptive layer, adherent layer, and base layer thickness.

It is to be understood that the overall substrate and discrete layer thicknesses for a particular substrate construction will vary depending on many factors, such as the types of materials that are used to form each layer, whether a tie layer is used at all, and the particular type of substrate application.

In an example embodiment, comprising a three-layer construction of a base layer, a tie layer, and an ink receptive layer formed from the materials noted above, the substrate can have an overall sheet thickness in the range of from about 10 to 750 micrometers ($\mu$m), more preferably in the range of 20 to 500 $\mu$m, the base layer can have a thickness in the range of from about 5 to 745 $\mu$m, more preferably in the range of 10 to 500 $\mu$m, the tie layer can have a thickness in the range of from about 2 to 745 $\mu$m, more preferably in the range of 5 to 500 $\mu$m and the ink receptive layer can have a thickness in the range of from about 2 to 745 $\mu$m more preferably in the range of 5 to 500 $\mu$m In a particular embodiment, where an above-constructed ink receptive substrate is used as an inkjet printable over-head transparency, the substrate has a preferred overall thickness of approximately 100 μm a base layer thickness of approximately 80 μm tie layer thickness of approximately 10 μm, and an ink receptive layer thickness of approximately 10 μm.

EXAMPLE NO. 4

Ink Receptive Substrate Comprising Dual Ink Receptive Layers

Figure 10:
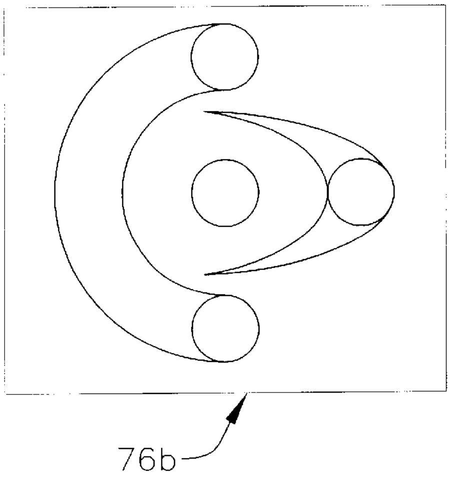
FIG. 10 is a schematic front view of a distribution block face used to form the ink receptive substrates of FIG. 3.

An ink receptive substrate, as discussed above and illustrated in FIG. 3, was prepared in the following manner using a multi-layer coextrusion process as illustrated in FIG. 5. The distribution block design to provide the construction shown in FIG. 3 is illustrated in FIG. 10. In this case, the distribution block **76*b*, rotates the feed streams by 90 degrees and at the same time splits the ink receptive blend feed streams (stream A of FIG. 8) to form two opposed ink receptive layers, with two opposed tie layers (stream C of FIG. 8), interposed between the ink receptive layers and the base layer (stream B of FIG. 8**).

In an example embodiment, comprising a dual multi-layer construction of a base layer having two opposed tie layers and respective ink receptive layers from the materials noted above, the substrate can have an overall sheet thickness in the range of from about 10 to 750 μm, more preferably in the range of 20 to 500 μm the base layer can have a thickness in the range of from about 5 to 740 μm, more preferably in the range of 10 to 500 μm, each tie layer can have a thickness in the range of from about 2 to 370 μm, more preferably in the range of 5 to 250 μm, and each ink receptive layer can have a thickness in the range of from about 2 to 370 μm, more preferably in the range of 5 to 250 μm.

In a particular embodiment, where an above-constructed ink receptive substrate is used as a dual side inkjet printable graphic media, the substrate has a preferred overall thickness of approximately 175 μm, a base layer thickness of approximately 125 μm, each adherent layer thickness of approximately 10 μm, and each ink receptive layer thickness of approximately 15 μm.

EXAMPLE NO. 5

Ink Receptive Substrate in the Form of a Labelstock

An ink receptive substrate, as discussed above and illustrated in FIG. 4, was prepared in the manner described above in any of the Example Nos. 1, 2 and 3, in addition to this a layer of pressure sensitive adhesive (PSA) material was deposited onto the exposed base layer surface by either direct coating with the PSA 40, or the PSA 40 may be transferred from a liner 42 with which the ink receptive substrate face stock is combined.

In an example embodiment, comprising an ink receptive substrate labelstock construction of a base layer, an adherent tie layer, an ink receptive layer, a PSA layer, and a release liner each formed from the materials noted above, the construction can have an overall sheet thickness in the range of from about 10 to 1500 μm, more preferably in the range of 20 to 1000 μm, the base layer can have a thickness in the range of from about 5 to 745 μm, more preferably in the range of 10 to 500 μm, the adherent tie layer can have a thickness in the range of from about 2 to 740 μm, more preferably in the range of 5 to 500 μm, the ink receptive layer can have a thickness in the range of from about 2 to 745 μm, more preferably in the range of 10 to 500 μm, the PSA layer can have a thickness in the range of from about 2 to 500 μm, more preferably in the range of 5 to 250 μm, and the release liner can have a thickness in the range of from about 10 to 1480 μm, more preferably in the range of 20 to 1000 μm.

In a particular embodiment, where an above-constructed ink receptive substrate is used as an inkjet printable labelstock, the construction has a preferred overall thickness of approximately 300 μm, a base layer thickness of approximately 80 μm, an adherent tie layer thickness of approximately 10 μm, an ink receptive layer thickness of approximately 10 μm, a PSA layer thickness of approximately 25 μm, and a release liner thickness of approximately 175 μm.

Figure 12:
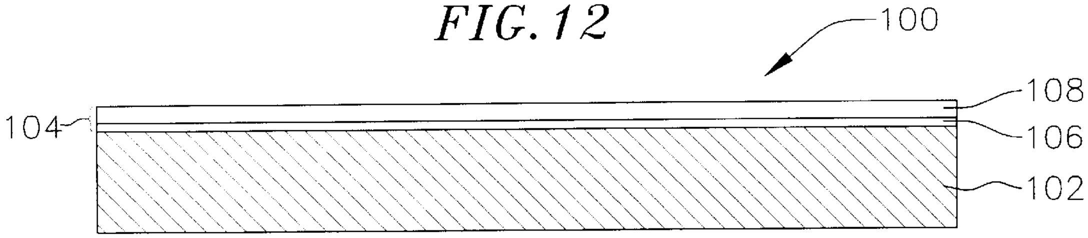
FIG. 12 is a schematic cross-sectional side view of an embodiment of an ink receptive substrate of this invention comprising a dual layer ink receptive surface.

FIG. 12 illustrates an alternative embodiment of an ink receptive substrate 100, constructed according to principles of this invention, comprising a dual layer ink receptive substrate construction. Generally, this embodiment is similar to that disclosed above and illustrated in FIG. 1, comprising a base layer 102 and a dual layer ink receptive substrate construction 104 comprising a first ink receptive layer 106 disposed over a surface of the base layer 102, and a second ink receptive layer 108 disposed over a surface of the first ink receptive layer.

In this dual layer construction, the first ink receptive layer 102 is the same as the ink receptive layer described above and illustrated in FIGS. 1 to 4. Further, the ink receptive layer is made in the manner as described above and illustrated in FIGS. 5 to 11.

The second ink receptive layer 106 is formed from a coating composition that provides further ink receptive properties, and provides other desired properties to the substrate construction. For example, the second ink receptive layer 106 can be formed from a coating material that, in addition to providing ink receptive properties, provides properties of weatherability and/or UV resistance to the substrate surface.

A first example second ink receptive layer is a coating composition like that disclosed in U.S. Patent application Ser. No. 08/899,562, filed on Jul. 24, 1997, which is incorporated herein by reference. In an example embodiment, the second ink receptive layer 106 comprises a composition including an emulsion polymer and at least one water-soluble cationic polymer. Emulsion polymers useful for forming the composition include ethylene-vinyl acetate (EVA) emulsion polymers, acrylic polymers, and polyurethane polymers.

The composition can optionally include a pigment dispersed or mixed therein. The cationic polymer fixes acid dye colorants in water-based inks, and diminishes dye diffusion. Preferably, the composition includes at least two water-soluble cationic polymers. Example cationic polymers include a polymerized diallyldimethylammonium compound and a copolymer of dimethylaminoethyl acrylate or methacrylate and at least one hydroxy-lower organic acrylate or methacrylate, with hydroxyethyl acrylate (HEA) and hydroxyethyl methacrylate (HEMA) being most preferred.

In some embodiments, a nonionic or cationic surfactant is included within the composition to enhance print quality of the coating. A preferred ink receptive composition has, on a percent by weight (dry weight) basis, about 15–70% emulsion polymer, about 5–50% of at least one water-soluble cationic polymer, up to about 60% pigment(s), and up to about 10% of one or more surfactants.

Suitable EVA emulsion polymers include those available, for example, from Air Products & Chemicals, Inc., Allentown, Pa., under the AIRFLEX trademark. Examples include AIRELEX 465™ (65% solids) and AIRFLEX 7200™ (72–74% solids). Another suitable EVA emulsion polymer is AIRFLEX 426™, a high solids, carboxylated, EVA polymer partially functionalized with carboxyl groups. This polymer is thought to improve the water resistance of the resulting ink receptive coating, particularly when the coated substrate is imaged with a dye-based ink. It is believed that the AIRELEX brand EVA emulsion polymers are stabilized with up to about 5% by weight polyvinyl alcohol (PVOH) and/or, in some formulations, a nonionic surfactant. EVA emulsion polymers used in the present invention preferably have a solids content of from about 40 to 75%.

The EVA emulsion polymer preferably comprises from about 15 to 70%, more preferably from about 25 to 65% by weight of the ink receptive composition, on a dry weight basis (meaning that water is not included in the calculation of the compositional percentages).

Water-soluble cationic polymers useful in forming second ink receptive layers of this invention embodiment include, but are not limited to, quaternary ammonium polymers (also known as polyquaternary ammonium salts, polyquats and quaternary polymers). Nonlimiting examples of quaternary ammonium polymers include polydiallyldimethylammonium compounds and copolymers of quaternary dimethylaminoethyl acrylate or methacrylate and one or more hydroxy-lower organic acrylate or methacrylate, for example, hydroxyethyl acrylate (HEA) and hydroxyethyl methacrylate (HEMA). To maintain charge neutrality, a onovalent or divalent counterion, Z, is associated with each uaternary ammonium center. Nonlimiting examples of such counterions include halides, (for example, chloride) and dimethylsulfate anion.

In an example embodiment, the composition further includes one or more cationic or nonionic surfactants, which help to wet any optional pigment and/or enhance print quality of the resulting composition. Nonlimiting examples of nonionic surfactants include alkylphenol ethoxylates, such as nonylphenol ethoxylate, and Disponil A 3065, an ethoxylated nonionic surfactant available from Henkel of America Inc. (King of Prussia, Pa.). A nonlimiting example of a cationic surfactant a useful in the practice of the invention is hexadecyl trimethylammonium chloride (HDTMAC), available from Akzo Nobel Chemicals Inc. (Chicago, Ill.). Anionic surfactants should be avoided because of their likely electrostatic interaction with the cationic, water-soluble polymer(s).

Preferably, up to about 10% by weight (on a dry weight basis) of one or more surfactants is employed in the ink receptive composition. Too much surfactant can potentially cause the coating to have air bubbles, which could adversely effect print quality when coated on film substrates. Other components, such as thickeners and defoamers can be added to the formulation to improve processability.

Pigments can optionally be mixed with the composition to increase the opacity and/or modify the porosity of the underlying coated first ink receptive layer. Inorganic pigments are especially preferred; nonlimiting examples include silica (preferably, amorphous silica gels), silicic acid, clays, zeolites, alumina, $TiO_2$, $M_gCO_3$ and the like. The pigment increases the ink absorption and improves the print quality and water resistance of the dried coating, and enables the coating to be used with water-based inks containing a dye colorant, as well as pigmented, water-based inks. Preferred ink receptive compositions prepared in accordance with the present invention can include up to about 60% by weight pigment, based on the dry weight of the total composition.

In a second example, the second ink receptive layer can also be formed from an entirely water-soluble polymer composition, i.e., one not comprising an emulsion polymer as discussed above. An example composition of this type can comprise one or more water-soluble resins selected from the group including water-soluble vinyl polymer resins, such as polyvinyl alcohol, and polyvinyl pyrrolidone; polyacrylic polymer resins; water-soluble cellulose polymer resins, such as methyl cellulose, ethyl cellulose, carboxymethyl cellulose, and hydroxyethyl cellulose; and synthetic water-soluble polymer resins, such as polyethylene oxide, and polyethylene-imine.

Additionally, the water-soluble polymer composition may include colloidal silica to improve the wettability of the second ink receptive layer by virtue of the presence of the SiOH group of the colloidal silica per se and absorbed water. The presence of colloidal silica can also impart an anti-static property to the second ink receptive layer. The water-soluble composition can also include a water-soluble cationic polymer as described above. An example water-soluble composition useful for forming the second ink receptive layer is disclosed in U.S. Pat. No. 5,622,997, which is incorporated herein by reference.

In a preferred second example, the water-soluble composition comprises in the range of from about 50 to 90 percent by weight water-soluble polymer (which can be in the form of a single ingredient or a combination of two or more of the above-described water-soluble polymers), up to about 30 percent by weight water-soluble cationic polymer, and a remaining amount pigments, surfactants, and microbiocides.

In a preferred second example, the second ink receptive layer is formed from a water-soluble composition comprising a blend of N-vinyl pyrrolidone copolymer and polyvinyl alcohol, diallyldimethylammonium chloride, a defoamer, a surfactant, and a biocide in the range of proportions presented above.

The second ink receptive layer is disposed onto the surface of the first ink receptive layer by conventional methods, such as by spray coating, roll coating, extrustion and the like. In an example embodiment, the second ink receptive layer is formed sequentially after formation of the first ink receptive layer.

A feature of the second ink receptive layer is that it is compatible with the underlying ink receptive layer, in that they are both hydrophoblic. Thereby avoiding the need to use a compatiblizing or tie layer in between.

The second ink receptive layer works with the underling first ink receptive layer to provide a substrate surface that works particularly well with ink jet printers and that has a high degree of ink receptivity toward both pigment-based and dye-based inks, colored as well as black. As mentioned above, the second ink receptive layer can be formulated to provide added beneficial properties of UV resistance and/or weatherability as well.

The second ink receptive layer functions to improve ink receptivity by forming an ionic bond with the ink medium dispensed onto the substrate surface. The underlying first ink receptive layer 104 works with the second ink receptive layer 106 to further improve ink receptivity by absorbing the ink medium because of its inherent property hydrophillicity, as described in greater detail above. Dual ink receptive layer substrate embodiments of this invention provide an ink receptive surface having improved properties of color density, resolution, color gradation, drying time, smudgeproofness and water-fastness when compared to conventional ink receptive substrates.

An additional feature of dual ink receptive layer substrate embodiments of this invention is that they can be produced as thin film constructions. Because the first and second ink receptive films work together in a complementary/synergistic fashion to provide, the effective thickness of each layer can be thinner that that otherwise needed for a single layer ink receptive substrate construction. Thus, dual layer ink receptive substrate embodiments of this invention can have a combined a first and second ink receptive layer thickness that is less than that of an ink receptive substrate formed from any single ink receptive layer.

In an example embodiment, the first ink receptive layer has a coating thickness within the range noted above for the ink receptive substrate embodiments illustrated in FIGS. 1 to 4. The second ink receptive layer can have a coating thickness in the same range as that of the first ink receptive layer.

Ink receptive substrates of this invention make use of a specially designed blend of a water-soluble polymer and a substantially water-insoluble polymer to provide a superior ink receptive surface. When disposed on a suitable base layer, such ink receptive surface provided an inherently printable substrate that without further treatment or topcoating, when printed onto, displays improved properties of optical clarity, print quality, and surface integrity, when compared with conventional ink receptive substrates having a topcoated, voided or porous surface structure. Specifically, ink receptive substrates of this invention provide improved gloss and haze, color density, water fastness, and scuff resistance.

While ink receptive substrates, and method of forming the same, of this invention have been described and illustrated as being receptive to an ink media transferred via inkjet process, it is to be understood that ink receptive substrates of this invention are receptive to dye and pigment-based ink media that are transferred by other techniques. Thus, ink receptive substrates of this invention are intended to be useful for receiving dye and pigment-based ink media by various ink transfer techniques, including but not limited to inkjet printing.

Additionally, ink receptive substrates of this invention comprising such ink receptive layer and base layer construction, are produced via multi-layer coextrusion process that is a more efficient and cost effective method of manufacturing when compared to those conventional ink receptive substrates formed by the multi-step processes of topcoating or other subsequent treatment to obtain a voided or porous surface structure. Specifically, the use of a multilayer coextrusion process enables the ink receptive layer to be formed simultaneously with the base layer or any intermediate adherent tie layer, thereby avoiding the need for multi-step processing.

Although limited embodiments of ink receptive substrates and methods for making the same according to principles this invention have been described herein, many modifications and variations will be apparent to those skilled in the art.

Accordingly, it is to be understood that, within the scope of the appended claims, ink receptive substrates of this invention may be prepared other than as specifically described herein.

What is claimed is:

1. An ink-receptive substrate construction comprising:

a base layer formed from a water-insoluble thermoplastic polymer; and an ink-receptive layer disposed over the base layer to provide an inherently print-receptive surface without further surface treatment;

wherein the ink-receptive layer is formed from a melt-processable blend of a water-soluble polymer and a substantially water-insoluble polymer, the water-soluble polymer being selected from the group of polymers consisting of polyalkyl oxazolines, polyphenyl oxazolines, polyvinyl pyrrolidones, polyacrylic-acids, polymethyl methacrylates, polymethacrylic acids, styrene maleic anhydrides, alkyl celluloses, carboxyalkyl celluloses, hydroxyalkyl celluloses, polyethylene oxides, polyethylene-imines, and mixtures thereof.

2. The construction as recited in claim 1 wherein the blend comprises in the range of from 20 to 80 percent by weight water-soluble polymer, and in the range of from 20 to 80 percent by weight substantially water-insoluble polymer based on the total weight of the blend.

3. The construction as recited in claim 1 wherein the substantially water-insoluble polymer is selected from the group of polyolefins and polyesters, consisting of modified and unmodified polyesters, polypropylenes, polyethylenes, polystyrenes, polybutylenes, and copolymers and mixtures thereof.

4. The construction as recited in claim 1 wherein the blend has a melting temperature in the range of from about 100 to 600° F.

5. The construction as recited in claim 1 wherein the water-soluble polymer is polyalkyl oxazoline.

6. The construction as recited in claim 5 wherein the polyalkyl oxazoline has a weight average molecular weight in the range of from about 50,000 to about 1,000,000, and kinematic viscosity in the range from about 18 to about 90 centistokes.

7. The construction as recited in claim 5 wherein the blend further comprises a compatibilizing agent that is chemically compatible with both the water-soluble polymer and the substantially water-insoluble polymer.

8. The construction as recited in claim 5 wherein the substantially water-insoluble polymer is a polyolefin.

9. The construction as recited in claim 7 wherein the compatibilizing agent is an anhydride-modified polyolefin.

10. The construction as recited in claim 5 wherein the substantially water-insoluble polymer is a polyester.

11. The construction as recited in claim 10 wherein the blend further comprises a compatibilizing agent that is a modified polyester.

12. The construction as recited in claim 10 wherein the polyester is selected from the group consisting of polycaprolactones, polyethylene-adipates, unsaturated polyesters, cyclo-polyesters, substituted aliphatic polyesters, and combinations thereof.

13. The construction as recited in claim 1 wherein the water-insoluble thermoplastic polymer used to form the base layer has a melting temperature in the range of from about 150 to 600° F.

14. The construction as recited in claim 1 wherein the base layer is selected from the group of thermoplastic materials consisting of polyolefins, polyesters, polyurethanes, polyvinyl chlorides, polyamides, polystyrene, ethylene vinyl alcohol, and mixtures thereof.

15. The construction as recited in claim 1 wherein the base layer and ink-receptive layer are formed simultaneously by coextrusion.

16. An ink-receptive substrate construction comprising:

a base layer formed from a water-insoluble, thermoplastic polymer;

an ink-receptive layer disposed over the base layer to provide an inherently print-receptive surface without further surface treatment, formed from a melt-processable blend of a water-soluble polymer and a substantially water-insoluble polymer; and a tie layer interposed between the base layer and the ink-receptive layer, the tie layer being formed from a thermoplastic polymeric material that is chemically compatible with both adjoining layers.

17. The construction as recited in claim 16 wherein the base layer, tie layer, and ink-receptive layer are formed simultaneously.

18. An ink-receptive substrate construction comprising:

a base layer formed from a water-insoluble, thermoplastic polymer;

an ink-receptive layer disposed over the base layer to provide an inherently print-receptive surface without further surface treatment, formed from a melt-processable blend of a water-soluble polymer and a substantially water-insoluble polymer; and an adhesive layer disposed over a surface of the base layer opposite from the ink-receptive layer, and a flexible substrate having a release surface disposed onto the adhesive layer.

19. An ink-receptive substrate construction comprising:

a base layer formed from a water-insoluble, thermoplastic polymer;

a first ink-receptive layer disposed over the base layer to provide an inherently print-receptive surface without further surface treatment, formed from a melt-processable blend of a water-soluble polymer and a substantially water-insoluble polymer; and a second ink-receptive layer disposed over the first ink-receptive layer.

20. The construction as recited in claim 19 wherein the second ink-receptive layer further comprises an emulsion polymer selected from the group consisting of ethylene vinyl acetates, acrylics, polyurethanes, and mixtures thereof.

21. The construction as recited in claims 19 or 20 wherein the second ink-receptive layer comprises at least one water-soluble polymer.

22. The construction as recited in claim 21 wherein the at least one water-soluble polymer is selected from the group consisting of vinyl polymer resins, polyacrylic polymer resins, cellulose polymer resins, synthetic water-soluble polymer resins, and mixtures thereof.

23. The construction as recited in claims 21 further comprising an inorganic pigment.

24. An ink-receptive substrate construction as recited in claim 21, wherein the water-insoluble thermoplastic polymer has a processing temperature in the range of from about 250 to 550° F.;

and wherein the melt-processable blend of a water-soluble polymer and a substantially water-insoluble polymer has a melt temperature in the range of from about 100 to 600° F.

25. The construction as recited in claim 16 wherein the melt processable blend comprises in the range of from 20 to 80 percent by weight water-soluble polymer, and in the range of from 20 to 80 percent by weight substantially water-insoluble polymer based on the total weight of the blend.

26. The construction as recited in claim 16 wherein the water-soluble polymer is selected from the group of compounds consisting of polyvinyl alcohols, polyalkyl oxazolines, polyphenyl oxazolines, polyvinyl pyrrolidones, polyacrylic-acids, polymethyl methacrylates, polymethyl methacrylic-acids, styrene maleic anhydrides, alkyl celluloses, carboxyalkyl celluloses, hydroxyalkyl celluloses, polyethylene oxides, polyethylene-imines, and mixtures thereof.

27. The construction as recited in claim 26 wherein the substantially water-insoluble polymer is selected from the group of polyolefins and polyesters consisting of modified and unmodified polyesters, polypropylenes, polyethylenes, polystyrenes, polybutylenes, and copolymers and mixtures thereof.

28. The construction as recited in claim 16 wherein the water-soluble polymer is polyalkyl oxazoline.

29. The construction as recited in claim 28 wherein the polyalkyl oxazoline has a weight average molecular weight in the range of from about 50,000 to about 1,000,000, and a kinematic viscosity in the range from about 18 to about 90 centistokes.

30. The construction as recited in claim 28 wherein the substantially water-insoluble polymer is a polyolefin.

31. The construction as recited in claim 29 wherein the blend further comprises a compatibilizing agent that is chemically compatible with both the water-soluble polymer and the substantially water-insoluble polymer.

32. The construction as recited in claim 31 wherein the compatibilizing agent is an anhydride modified polyolefin.

33. The construction as recited in claim 28 wherein the substantially water-insoluble polymer is a polyester.

34. The construction as recited in claim 33 wherein blend further comprises a compatibilizing agent that is a modified polyester.

35. The construction as recited in claim 16 wherein the water-soluble polymer is polyvinyl alcohol.

36. The construction as recited in claim 35 wherein the polyvinyl alcohol has a degree of hydrolysis in the range of from about 80 to 98 percent, and a degree of polymerization in the range of from about 150 to 650.

37. The construction as recited in claim 35 wherein the substantially water-insoluble polymer is a polyester compound.

38. The construction as recited in claim 37 wherein the polyester compound is selected from the group consisting of polycaprolactones, polyethylene-adipates, unsaturated polyesters, cyclo-polyesters, substituted aliphatic polyesters, and combinations thereof.

39. The construction as recited in claim 24 wherein the base layer is selected from the group of thermoplastic material consisting of polyolefins, polyesters, polyurethanes, polyvinyl chlorides, polyamides, polystyrene, ethylene vinyl alcohol, and mixtures thereof.

40. The construction as recited in claim 16 wherein base layer, tie layer, and ink receptive layer are formed simultaneously.

41. The construction as recited in claim 16 further comprising an adhesive layer disposed over a surface of the base layer opposite from the ink receptive layer, and a flexible substrate having a release surface disposed onto the adhesive layer.

42. The construction as recited in claim 16 further comprising a second ink receptive layer disposed over the first ink receptive layer.

43. The construction as recited in claim 42 wherein the second ink receptive layer further comprises an emulsion polymer selected from the group consisting of ethylene vinylacetates, acrylics, polyurethanes, and mixtures thereof.

44. The construction as recited in claims 42 or 43 wherein the second ink receptive layer comprises at least one water-soluble polymer.

45. The construction as recited in claim 44 wherein the at least one water-soluble polymer is selected from the group consisting of vinyl polymer resins, polyacrylic polymer resins, cellulose polymer resins, synthetic water-soluble polymer resins, and mixtures thereof.

46. The construction as recited in claim 44 further comprising an inorganic pigment.

47. An ink-receptive substrate construction as recited in claim 19, wherein the water-insoluble thermoplastic polymer has a processing temperature in the range of from about 250 to 550° F.; and wherein the melt-processable blend of a water-soluble polymer and a substantially water-insoluble polymer has a melt temperature in the range of from about 100 to 600° F.

48. The construction as recited in claim 19 wherein the second ink-receptive layer comprises an ethylene-vinyl acetate emulsion polymer and at least one water-soluble, cationic polymer.

49. An ink-receptive substrate label construction as recited in claim 23, wherein the melt-processable blend comprises, a base layer formed from a water-insoluble thermoplastic polymer;

from 20 to 80 percent by weight water-soluble polymer and from 20 to 80 percent by weight substantially water-insoluble polymers based on the total weight of the blend.

50. The construction as recited in claim 18 wherein the water-soluble polymer is selected from the group of compounds consisting of polyvinyl alcohols, polyalkyl oxazolines, polyphenyl oxazolines, polyvinyl pyrrolidones, polyacrylic-acids, polymethyl methacrylates, polymethyl methacrylic-acids, styrene maleic anhydrides, alkyl celluloses, carboxyalkyl celluloses, hydroxyalkyl celluloses, polyethylene oxides, polyethylene-imines, and mixtures thereof.

51. The construction as recited in claim 18 wherein the substantially water-insoluble polymer is selected from the group of polyolefins and polyesters consisting of modified and unmodified polyesters, polypropylenes, polyethylenes, polystyrenes, polybutylenes, and copolymers and mixtures thereof.

52. The construction as recited in claim 18 wherein the water-soluble polymer is polyalkyl oxazoline.

53. The construction as recited in claim 52 wherein the polyalkyl oxazoline has a weight average molecular weight in the range of from about 50,000 to about 1,000,000, and kinematic viscosity in the range from about 18 to about 90 centistokes.

54. The construction as recited in claim 18 wherein the substantially water-insoluble polymer is a polyolefin.

55. The construction as recited in claim 54 wherein the blend further comprises a compatibilizing agent that is chemically compatible with both the water-soluble polymer and the substantially water-insoluble polymer.

56. The construction as recited in claim 55 wherein the compatibilizing agent is an anhydride modified polyolefin.

57. The construction as recited in claim 18 wherein the substantially water-insoluble polymer is a polyester compound.

58. The construction as recited in claim 57 wherein the blend further comprises a compatibilizing agent that is chemically compatible with both the water-soluble polymer and the substantially water-insoluble polymer.

59. The construction as recited in claim 58 wherein the compatibilizing agent is a modified polyester compound.

60. The construction as recited in claim 18 wherein the water-soluble polymer is polyvinyl alcohol.

61. The construction as recited in claim 60 wherein the polyvinyl alcohol has a degree of hydrolysis in the range of from about 80 to 98 percent, and a degree of polymerization in tile range of from about 150 to 650.

62. The construction as recited in claim 61 wherein the substantially water-insoluble polymer is a polyester compound.

63. The construction as recited in claim 62 wherein the polyester compound is selected from the group consisting of polycaprolactones, polyethylene-adipates, unsaturated polyesters, cyclo-polyesters, substituted aliphatic polyesters, and combinations thereof.

64. The label construction as recited in claim 18 further comprising a liner having a release surface disposed over the adhesive layer.

65. The construction as recited in claim 18 wherein the base layer and ink- receptive layer are formed simultaneously.

* * * * *

UNITED STATES PATENT AND TRADEMARK OFFICE

CERTIFICATE OF CORRECTION

PATENT NO. : 6,623,841 B1 Page 1 of 1
DATED : September 23, 2003
INVENTOR(S) : Venkatasanthanam et al.

It is certified that error appears in the above-identified patent and that said Letters Patent is hereby corrected as shown below:

Title page
Item [75], Inventors, insert -- Prakash Mallya, Sierra Madre, CA (US) --
Item [57], ABSTRACT, delete all occurrences of "ink receptive", insert -- ink-receptive --

Column 19,
Line 40, delete "claims", insert -- claim --
Line 43, delete "claim 21", insert -- claim 16 --
Line 52, delete "melt processable", insert -- melt-processable --

Column 20,
Line 22, After "wherein", insert -- the --

Column 21,
Line 13, delete "claim 23", insert -- claim 18 --
Lines 15-16, delete "a base layer formed from a water-insoluble thermoplastic polymer;"
Line 19, delete "polymers", insert -- polymer --

Column 22,
Line 23, delete "tile", insert -- the --
Line 32, delete "label"
Line 36, delete "ink- receptive", insert -- ink-receptive --

Signed and Sealed this

Fifth Day of April, 2005

JON W. DUDAS
*Director of the United States Patent and Trademark Office*